Oct. 25, 1949.
N. G. GARDNER
2,485,728
TRAP HOOK
Filed June 27, 1946
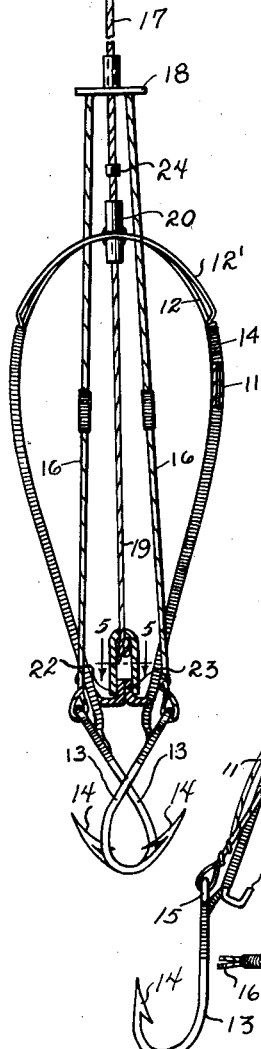
FIG_1_
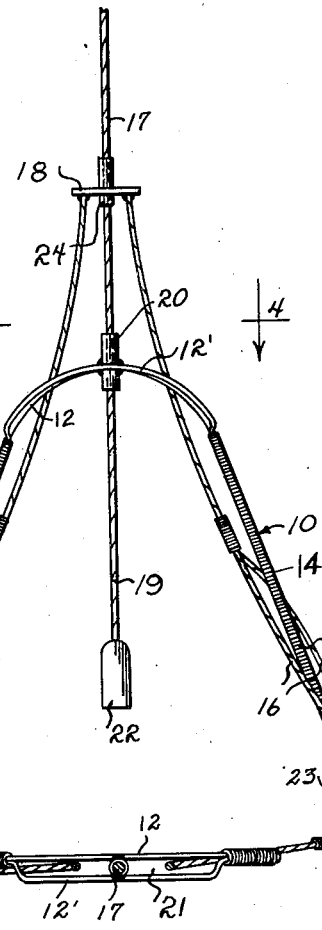
FIG_2_
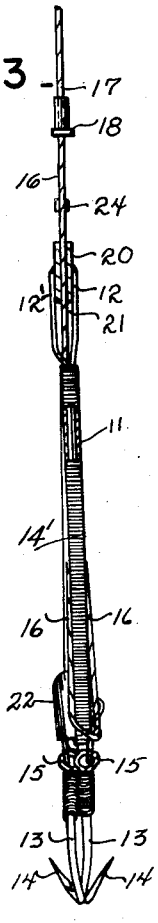
FIG_3_
FIG_4_
FIG_5_
INVENTOR.
NORMAN G. GARDNER
BY *Victor J. Evans & Co.*
ATTORNEYS Patented Oct. 25, 1949

2,485,728

UNITED STATES PATENT OFFICE 2,485,728

TRAP HOOK

Norman G. Gardner, Adrian, Mich.

Application June 27, 1946, Serial No. 679,815

3 Claims. (Cl. 43—36)

The invention relates to a trap-hook, and more especially to a spring tensioned trap-hook.

The primary object of the invention is the provision of a hook of this character, wherein there are two or more snag hooks which are normally brought together, and through spring action spread apart so as to assure a positive catch of a fish, the spring being latched under tension when the snag hooks are together, and the latter will be released to have the spring active for the spreading of such hooks on a catch.

Another object of the invention is the provision of a hook of this character, wherein the construction is novel and the assembly unique for a positive operation thereof, the said hook being possessed of few parts, thus economical in this connection in its set-up.

A further object of the invention is the provision of a hook of this character, wherein it is operative on a pull upon a fishing line, and can be reset with ease and dispatch.

A still further object of the invention is the provision of a hook of this character, which is simple in construction, thoroughly reliable and efficient in operation, strong, durable, readily and easily handled, compact, neat in appearance, quick acting, automatic in the working thereof, and inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a side elevation of the trap-hook constructed in accordance with the invention in catching position;

Figure 2 is a similar view showing the trap-hook in released position;

Figure 3 is an edge elevation when in the position shown in Figure 1;

Figure 4 is a sectional view taken on the line 4—4 of Figure 2 looking in the direction of the arrows;

Figure 5 is a detailed sectional view taken on the line 5—5 of Figure 1 looking in the direction of the arrows.

Similar reference characters indicate corresponding parts throughout the several views in the drawing.

Referring to the drawing in detail, the trap-hook constituting the present invention comprises a substantially U-shaped resilient spreading frame 10 having outwardly springy arms 11, and an intermediate cross connecting bridge 12. The ends of the arms 11 are secured to the snag hooks 13, and each hook is formed with a spur pointed bill 14, which is outwardly directed from the shank of the hook. A second cross bridge or guide bridge 12' of somewhat the same contour as the bridge 12 is connected at its ends to the arms 11 by a binding 14' and this binding extends down to and covers a portion of the shanks of the hooks 13.

On the ends of the shanks of the hooks 13 are formed eyes 15 to which are loosely connected flexible braces 16 which are made of a conventional metallic fishing line. A portion of a fishing line of the same material being indicated at 17. The braces 16 are joined at their free ends by a cross head 18 and between their connections to the eyes 15 and the cross head 18 the braces 16 are loosely extended through the slot 21 between the bridges 12 and 12' on opposite sides of the guide 20. The line 17 is threaded at its extension end 19 through the tubular guide 20 which is fixed in the slot 21 centrally thereof between the bridge 12 and guide bridge 12'. To this end 19 there is fixed a terminal latching thimble 22 that is adapted to receive the keepers 23 formed on the arms 11 adjacent the eyes 15. The keepers 23 extend inwardly of the arms 11 and are thus spaced inwardly of the hooks 15 formed on the shanks of the hooks 13, as best seen in Figures 1 and 2 of the drawings. However, when a catch is made and a pull exerted on the line 17, the thimble 22 will be released from the keepers 23 permitting the arms 11 to spring outwardly. Thus when the thimble 22 is engaged with the keepers 23, the hooks 13 are latched under tension of the frame 10 in overlapped relation to each other, for the setting thereof, to effect a sure catch of a fish when line fishing in the usual manner. Then when the catch is made, the pull upon the line 17 automatically releases the thimble from the keepers 23, and through the tension of the frame 10, the hooks are spread apart, causing the hooks 13 to engage in the mouth of the fish in opposite sides thereof through the medium of the bills 14 of these hooks to effect a positive catch. When the catch is made the pull transmitted on the hooks 13 is absorbed by the braces 16 to prevent undue bending of the arms 11 and possible loss of the fish snared by the hooks, thus the pull from the line is on the cross head 18 and the eyes 15 rather than on the arms 11.

The extension end 19 of the line 17 at the proper point intermediate of the cross head 18 and the guide 20, is provided with a stop or abutment collar 24 to limit the movement of the end 19 of the line 17 in opposite directions, and thus prevent the pulling of the end 19 of the line 17 from the said guide in the operation of the trap hook. The line 17 is pulled upon by a slight tug thereon as made by the bite of a fish. Latching thimble 22 may be separable from the line 17 or fixed thereto as described. At times it has been found desirable to have the line 17 foreshortened and to have the end thereof attachable to the main fishing line by a suitable swivel coupling, not shown.

The hook in its entirety is in the condition shown in Figure 1 of the drawings during the fishing period, and when a catch of a fish is to be had, the condition is altered to that shown in Figure 2 which assures a positive catch of the the fish.

What is claimed is:

1. A trap-hook of the kind described, comprising a springy spreading frame having arms, hooks fixed to the arms, eyes on the upper ends of the hooks, keepers on the lower ends of the arms adjacent the eyes of the hooks, a latching member engageable with the keepers to hold the frame against spreading the arms for the separation of the hooks, pull means for releasing the latching member from the keepers to permit the hooks to separate from each other, and flexible connections separate from said frame extending between said hooks and said pull means.

2. A trap-hook of the kind described, comprising a springy slotted spreading frame having arms, hooks fixed to the arms, eyes on the upper ends of the hooks, keepers on the lower ends of the arms adjacent the eyes of the hooks, a latching member engageable with the keepers to hold the frame against spreading the arms for the separation of the hooks, pull means for releasing the latching member from the keepers to permit the hooks to separate from each other, and flexible connections between the hooks and the said pull means, said flexible connections being guided through said slotted frame.

3. A trap-hook of the kind described, comprising a springy slotted spreading frame having arms, hooks fixed to the arms, eyes on the upper end of the hooks, keepers on the lower ends of the arms adjacent the eyes of the hooks, a latching member engageable with the keepers to hold the frame against spreading the arms for the separation of the hooks, pull means for releasing the latching member from the keepers to permit the hooks to separate from each other, flexible connections between the hooks and the said pull means, said flexible connections being guided through said slotted frame, and means for limiting the pulling action of the pull means.

NORMAN G. GARDNER.

REFERENCES CITED

The following references are of record in the file of this patent:

UNITED STATES PATENTS

| Number | Name | Date |
| --- | --- | --- |
| 712,497 | Coffin | Nov. 4, 1902 |
| 825,639 | Curtis | July 10, 1906 |
| 985,659 | Clayton | Feb. 28, 1911 |
| 1,183,527 | Blodgett | May 16, 1916 |